Sept. 6, 1966 G. POLENSKY 3,271,522

CIRCUIT ARRANGEMENT FOR DETERMINING THE CALL NUMBERS OF PARTY LINE SUBSCRIBERS

Filed Sept. 28, 1962 5 Sheets-Sheet 1

Sept. 6, 1966 G. POLENSKY 3,271,522

CIRCUIT ARRANGEMENT FOR DETERMINING THE CALL NUMBERS OF PARTY LINE SUBSCRIBERS

Filed Sept. 28, 1962 5 Sheets-Sheet 4

Sept. 6, 1966 G. POLENSKY 3,271,522

CIRCUIT ARRANGEMENT FOR DETERMINING THE CALL NUMBERS OF PARTY LINE SUBSCRIBERS

Filed Sept. 28, 1962 5 Sheets-Sheet 5

United States Patent Office 3,271,522
Patented Sept. 6, 1966

3,271,522

CIRCUIT ARRANGEMENT FOR DETERMINING THE CALL NUMBERS OF PARTY LINE SUBSCRIBERS

Gerhard Polensky, Munich, Germany, assignor to Siemens & Halske Aktiengesellschaft Berlin and Munich, a corporation of Germany Filed Sept. 28, 1962, Ser. No. 227,688
Claims priority, application Germany, Sept. 29, 1961, S 76,042
8 Claims. (Cl. 179—17)

The invention disclosed herein is concerned with a circuit arrangement for determining the call numbers of party line subscribers.

The determination of call numbers of subscribers to party lines is in general very difficult since there is associated with each party line only one subscriber circuit and accordingly only one input to a preselector member, for example only one call finder step. In order, nevertheless, to make possible the determination of the individual call numbers by economic means, there has therefore been ascribed to each subscriber—the maximum number of ten on a party line—one of the order numbers 1 to 0 which each subscriber dials upon making a call, or which is automatically sent out. In a known circuit arrangement operating in accordance with this principle, there is provided a number of coordinate fields serving for the determination of the call numbers or parts of call numbers and corresponding to the largest number of subscribers per party line, of which there is active, as a function of means determining the order digit of the subscriber in question, only the coordinate field corresponding to the order digit. Since only two digits can be dependably established with a coordinate characterizing field corresponding to the two free coordinates, an additional coordinate characterizing field is necessary for each additional pair of digits of the call number. The decoupling of the individual coordinate characterizing fields is effected in known manner by rectifiers, resistors or the like.

In another proposed arrangement, the determination of the individual call numbers is effected with less expenditure by providing a single known repeater matrix having a number of elementary columns characterizing the individual decades which corresponds to the number of places of the longest call number and having a plurality of elementary lines, characterizing the individual digit values per decade; the evaluation loops provided for each subscriber call number being connected in known manner, in accordance with the corresponding call number, with the repeater elements, for instance ferromagnetic toroidal cores, of the repeater matrix, via a separate decoupling element with the connecting point characterizing the subscriber's line to be identified, and the evaluation loops of subscriber lines of the same order number being connected together at their free ends and being connected, via a corresponding allotter contact which operates in known manner as a function of the specific subscriber to be identified, to the one terminal of a source of current which supplies the identifying signal, while the other terminal is connected, when called upon, to the connecting point which is to be identified.

The said arrangements for determining the call numbers of subscribers to party lines can be used both in plants in which one line-selector output is connected in common to all subscribers of a party line and the selection of the subscriber to be called is effected over a final selector as well as in plants in which an individual line-selector output is provided in order to avoid the expense of final selectors for each subscriber. Frequently both types of connection of party lines are combined in a telephone central office, in which connection in general party lines of the same type of connection are combined in separate sub-offices having different codes.

The present invention now relates to a switching arrangement for determining the call numbers of subscribers to party lines in communication and particularly in telephone plants in which the party lines are subdivided corresponding to their type of connection (individual or common line selector output) into groups with the use of known evaluation devices, for instance coordinate characterizing fields (panels), toroidal core evaluation fields (panels), in which there is associated with each call number an evaluation circuit characterizing the digits of said call number in the corresponding sequence, which circuit is tested by signal receivers. In accordance with the invention, this switching arrangement is characterized by the fact that in case of $n$-place call numbers, the evaluation device is equipped with $(n-1)$ place evaluation circuits, that in the case of subscribers with line-selector outputs common to several subscribers, in each case the first $(n-1)$ digits of the call number are determined by the corresponding evaluation circuit and the order number of the subscriber which forms the missing last digit is added automatically after the testing of the evaluation device, and that in the case of subscribers with individual line-selector output, the last $(n-1)$ digits of the call number are determined by the corresponding evaluation circuit and the sub-office digit forming the missing first digit of the call number is automatically added.

Differing from the previously known or proposed switching arrangements in which the complete sequence of the call numbers is determined by the corresponding evaluation circuits of the evaluation device, in the switching arrangement in accordance with the present invention, only $(n-1)$ places of the $n$-place call numbers are determined by the corresponding evaluation circuits of the evaluation device and the sequence of digits determined upon the testing in each case of one of the evaluation circuits is supplemented as a function of the type of connection of the party line by the prefixing or adding thereto of the digits still missing to make the complete call number. The result is a reduction in the expense for the evaluation device. On the other hand, either a set of signal receivers is saved or else, in case of stepwise testing of the evaluation device, by a central set of signal receivers, the number of switchings of the signal receivers per identification process is reduced.

The determination of the digit to be added in each case does not afford any difficulty. In the one case, the corresponding order number to be added is already stored. In the other case, the differential determination, corresponding to the two possible types of connection of party lines, of two sequences of digits staggered by one place with respect to each other by the evaluation circuits of the evaluation device permits a simple determination of the sub-office digits since upon the checking of the evaluation circuit actively connected at the time, it needs merely be checked whether the first digit of the individual series of digits corresponds to the sub-office digit which characterizes the sub-office with line-selector outputs common to several subscribers. In accordance with a further development of the invention, the preparation in proper place position of the individual digits of a call number for forwarding to a storer which further processes them is effected by the fact that place relays serving to transfer the digits to a storer are provided in a number corresponding to the maximum number of places of the call numbers, each of which relays characterizes one place of the call number, these relays being connected individually one after the other, and that a combined storage and testing device is provided which stores in each case the first digit of the individual sequences of digits and determines the sequence of the connecting of the place relays as a function of this digit.

In evaluation devices having a central set of signal receivers which tests the individual evaluation circuits in step-wise fashion, a particularly simple switching arrangement can be obtained in the manner that the connecting of the signal receivers for the testing of the evaluation device is effected by contacts of the or some of the place relays. In this way, the testing processes necessary to determine the individual digits of the call number are included organically in the course of the transfer of the call number to the storer.

Since it is not at first known whether the first digit of the sequence of digits determined by an evaluation circuit active at the time is to be transmitted as a first or a second digit of the call number to the storer which further processes same, there is required, in addition to the place relay, an additional connecting relay which is connected successively before the place relays and which connects the signal receivers for determination of the first digit of each series of digits to the evaluation device, while the connecting of the signal receivers for determination of the remaining digits is effected by contacts of the place relays characterizing the last ($n$—2) places of the $n$-place call number.

In the case of plants, in which the corresponding locality code is transmitted before each call number to the storer which further processes same, the additional connecting relay can be dispensed with in accordance with a further development of the invention in the manner that the connecting of signal receivers for the determination of the first digit of each series of digits is effected by contacts of the place relay which characterizes the highest place of the locality code.

In the same way, in telephone systems consisting of main and sub-plants, and having means for determining the call number of the individual subscribers, in which the code of the individual sub-plants is determined by the identification device of the main plant, the testing step necessary to determine the origin of the calling subscriber can be included in the control processes for preparing the individual digits of a call number in the manner that in addition to the place relays, there is provided another relay which is connected in sequence in front before the place relays and via contacts, connects the signal receivers to the characterizing members associated with the sub-plant transmissions and in the manner that as a function of this testing, only the step relays necessary for the determination of the sub-office code are connected. The place and connecting relays can either be connected via a control switch in the form of a selector or a relay chain to the outputs of which the place relays are connected, or else these relays themselves may form a relay chain which is stepped by a pulse transmitter.

One embodiment of the invention is shown in the drawing in which

FIGS. 1 and 1$a$ are an overall view of a telephone office with party lines in different type of connection;

FIGS. 2 and 2$a$ show the identifying device for determining the individual call numbers;

Figure 1:
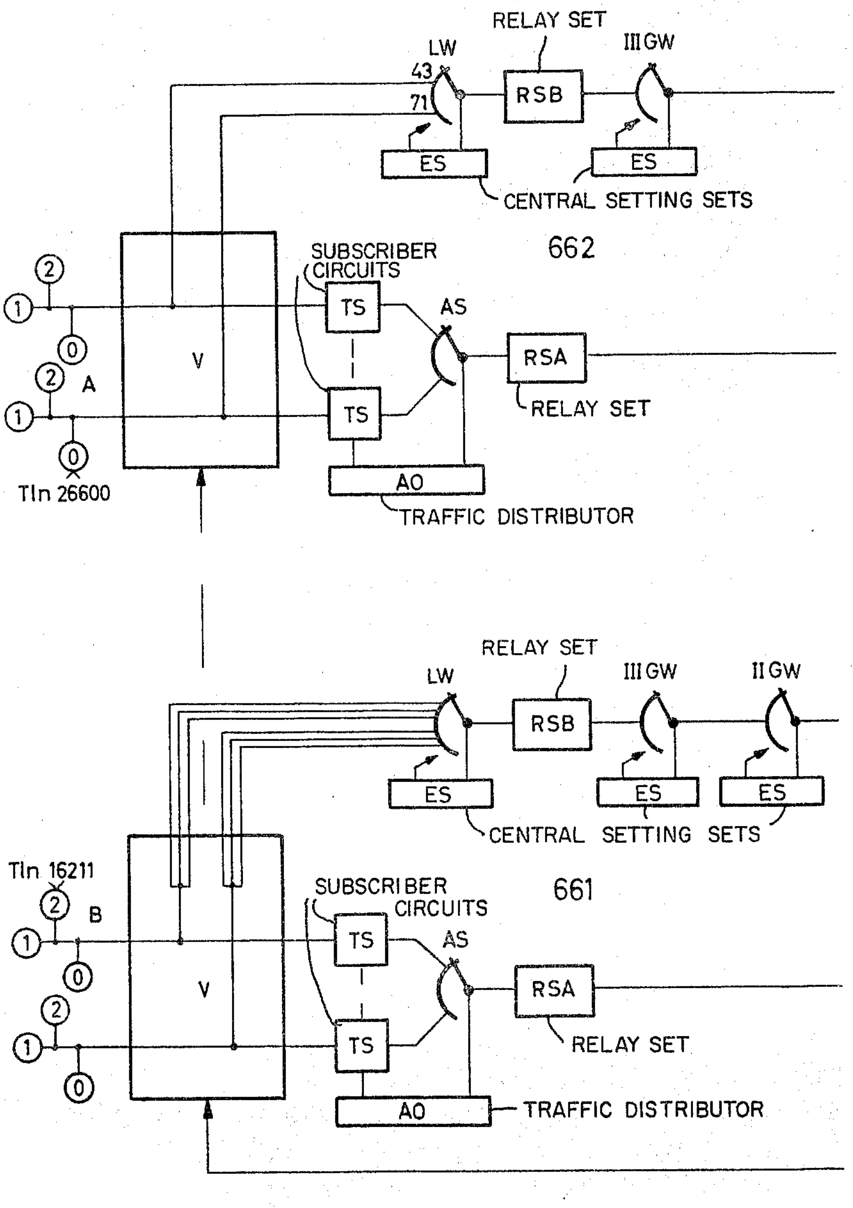

The telephone central office 66 shown in FIG. 1 consists of two sub-offices 1 and 2. In sub-office 1 an individual line selector output is provided for each subscriber, while in sub-office 2, several subscribers are connected in each case to the individual line-selector outputs. As example, a known selector system with central setting sets ES per selection stage is selected. The course of operation upon the making of a connection is, as known, the following:

When one of the subscribers, for instance subscriber 26600, removes his telephone receiver and the corresponding subscriber circuit TS is occupied, the latter gives off a stimulus for the traffic distribtor AO which sets a free line finder AS on the calling line, and then disconnects itself.

The line finder AS connects the calling subscriber to the relay set RSA which, in known manner, takes over the feeding, applies the dial tone and further controls the making of the connection with its pulse repeater which serves for the storage and transmitting of the incoming dial pulses.

As soon as a complete train of dial pulses is present in the pulse repeater of the relay set RSA, a setting set ES of the following selector stage is called upon, which evaluates the digits sent out and sets the connected group selector I GW in accordance with the marker principle. After the call has been connected through to the next selector stage, the setting set ES required for the setting of the group selector I GW is released. The setting of the following selector stages takes place in the same manner.

The setting set for the line selector LW is called upon two times successively, corresponding to the tens and ones digits to be processed. Thereupon, the relay set RSB is caused to take over the connection in the manner that immediately after the first testing, it gives off the call and calls upon the relay set RSA to connect the speaking wires through and to deliver the feed for the calling subscriber to the relay set RSB.

The selection among the two sub-offices 1 and 2 is made by the group selector I GW, depending on whether the setting is on the first or on the second decade. If a call to a subscriber of sub-office 2 is desired, then directly after the setting of the group selector I GW, the group selector III GW is set. The last digit of the call number which in this case remains over after the setting of the line selector LW is worked in known manner by a selector relay which is arranged in the line selector and which, by connecting a call generator of given frequency, effects the selection of the desired subscriber from among the subscribers who can be reached over this same line.

In case of outgoing traffic, after evaluation of the digit first dialed, for instance an 0, via the group selector I GW, the meter transmission Z–U$e$ with the direction selector RW is occupied. The meter transmission Z–U$e$ contains means for storing the data and values necessary for the determination of the charge. These include the number of charge units to be charged for a call, the call number of the desired subscriber, the direction code, by means of which the direction selector RW is set, and the call number of the calling subscriber. At the end of each conversation, the data stored in the number transmission is delivered to the central printing device consisting of a control transmission S$t$–U$e$, a time indicator ZG and a printing mechanism D.

The determination of the call number of the calling subscriber is effected in response to the meter transmission Z–U$e$ by the identifying device in general in the manner that in the meter transmission an identifying signal is connected to the trunk line leading from the calling subscriber to the meter transmission which signal is then evaluated via the evaluation circuits associated individually with each subscriber, and connected advisedly in the distribution frame V to the subscriber lines. Depending on the nature of the telephone system employed, the giving of the signal can take place directly over the speaking wires of the trunk line in case of simultaneous connection of the source of current supplying the identifying signal or else over a control wire which is connected through over all selection stages, for instance a *c*-wire.

Figure 2:
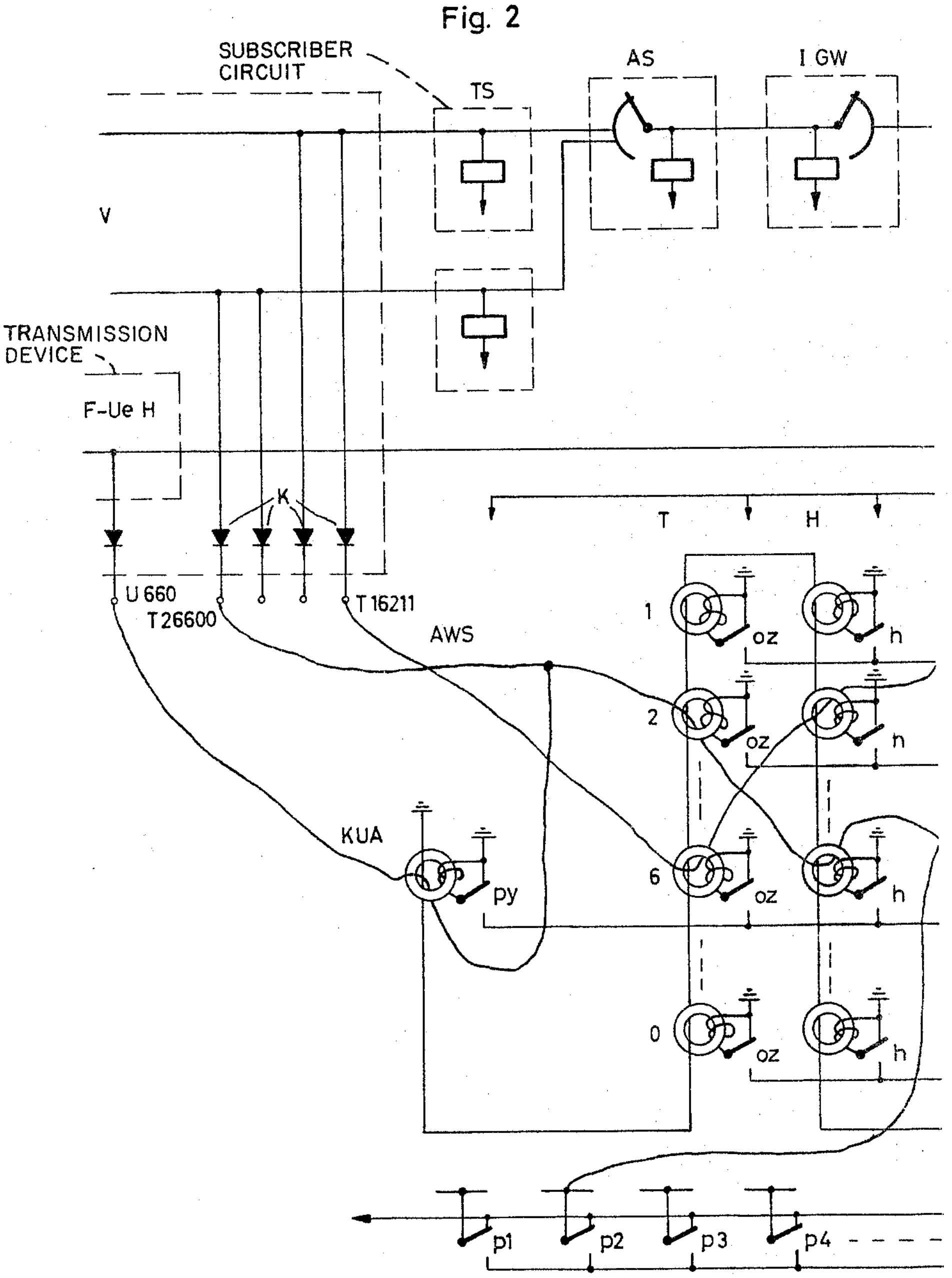
Figure 2A:
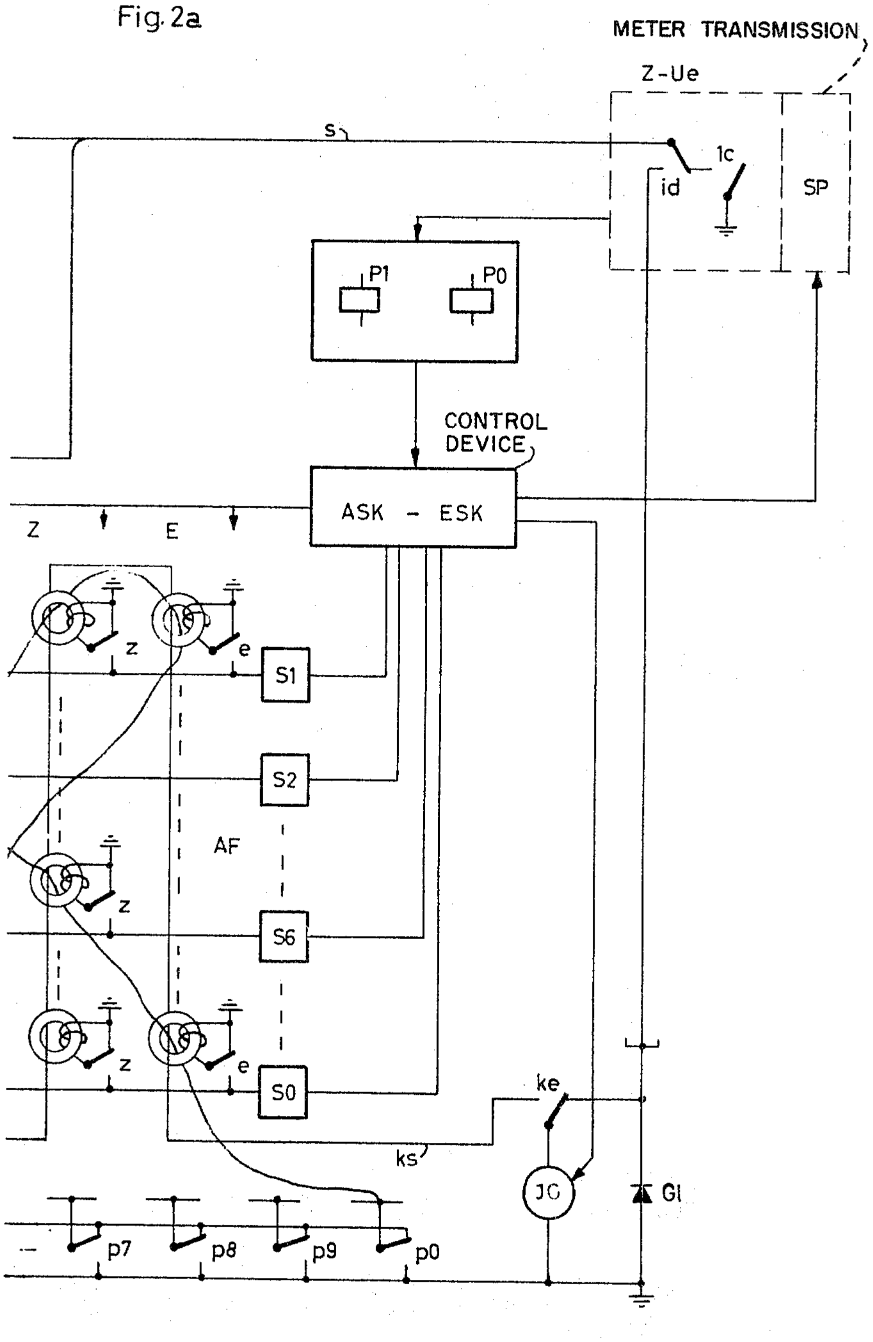

FIG. 2 shows further switching details of a particularly advantageous identifying device in which the signal is given over a control wire to the trunk line. The upper part of FIG. 2 shows the course of such a signal wire from the distribution frame V over the subscriber circuit TS, the line finder AS and the first group selector I GW to the meter transmission Z–U*e*. The subscriber-individual evaluation circuits consist of so-called evaluation loops AWS, each of which is guided by a number of magnetic toroidal cores corresponding to the number of digits to be characterized. These toroidal cores which act as transmitter are combined in the form of a matrix which is divided corresponding to the *n*-place digit sequences to be characterized by the individual evaluation loops into *n*-columns, for instance T, H, Z and E, corresponding to the thousands, hundreds, tens and ones digits, as well as into ten lines corresponding to the ten different digit values per place. During each identification process, the individual toroidal cores of the transmitter matrix are tested, column for column, by the signal receivers S1 to S0 as to their condition of excitation and in this way the toroidal core combination corresponding to the evaluation loop bearing the identification signal is determined. The connecting of the signal receivers S1 to S0 is controlled by the device ASK–ESK.

Figure 3:
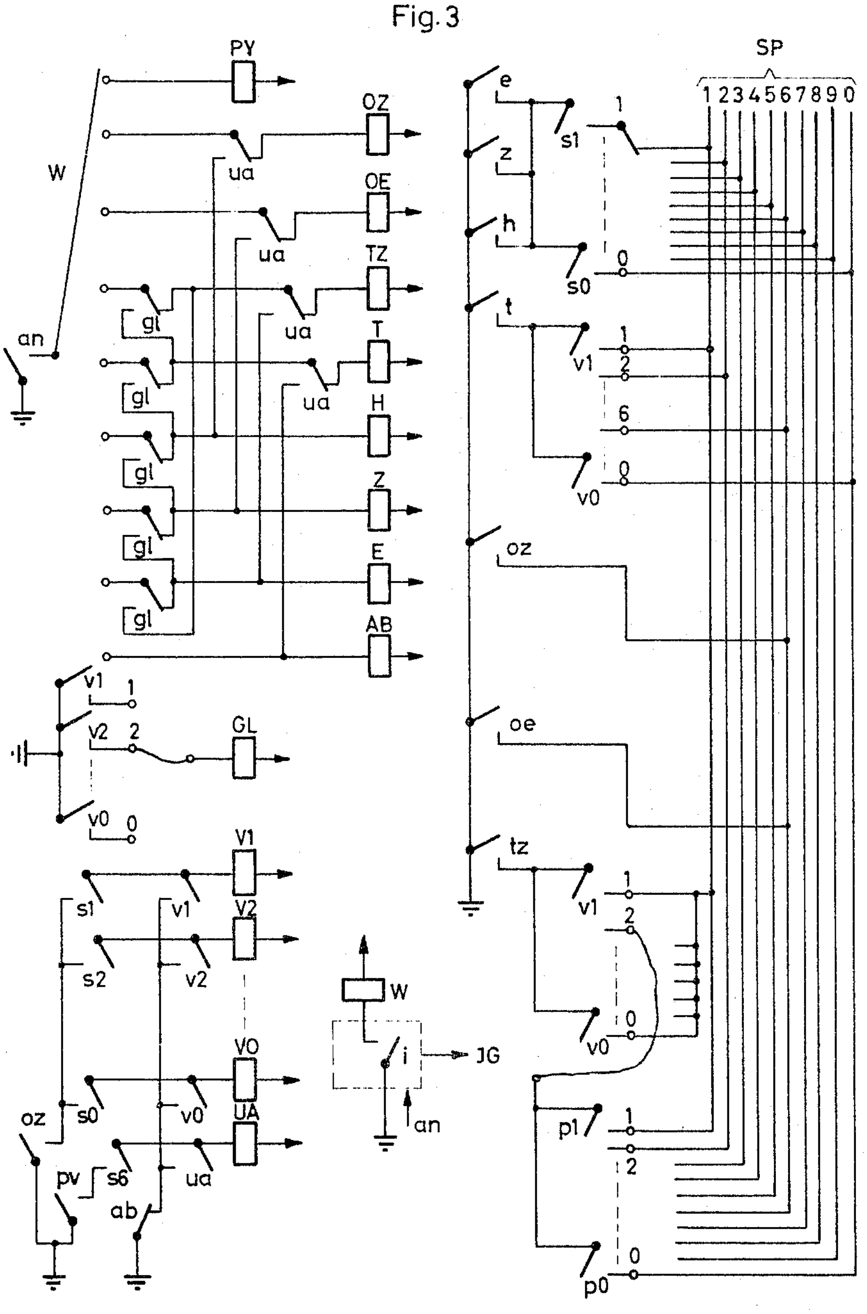
FIG. 3 shows the control device of the identifying device.

FIG. 3 shows further details of this control device. Corresponding to the five-place call numbers selected in FIG. 1, for instance 16211 and 26600, there are provided five place relays, namely TZ for the sub-office digit and T, H, Z and E for the thousands, hundreds, tens and ones digits. Two further place relays OZ and OE serve to characterize two-place locality codes. Furthermore, there is provided a connecting relay PV for connecting the signal receivers for a special pre-elimination testing, for instance to determine the origin of the calling subscriber in the case of connected sub-plants, a disconnecting relay AB for stopping the control device, a supervisory relay GL for supervising subscriber phones with line selector outputs common to several subscribers, a register unit V1 to V0 for intermediate storage of in each case the first digit of the series of digits determined by the evaluation device, and another supervisory relay UA for supervising telephone calls conducted by one of the connected sub-plants. The connecting relay PV, the place relays OZ to E and the disconnecting relay AB are connected individually, one after the other, by the control switch W. The stepping of this control switch, which is developed for instance as a selector, takes place step-wise by the pulse switch *i*. The manner of operation of this control device within the frame of the identifying device in accordance with FIG. 2 is as follows:

With the occupying of the meter transmission Z–Ue (FIG. 2)—response of the relay C of the meter transmission (not shown)—upon the closing of the contact *c* control ground is applied to the incoming signal wire *s* and in this way the connection from the calling subscriber to the meter transmission is maintained. As soon as the order number of the calling subscriber is evaluated in the meter transmission, the identifying device JD is called upon in known manner, and the order number transmitted to the identifying device. This order number is characterized by one of the relays P1 to P0, which, via one of its contacts *p* . . . connects the evaluation loops corresponding to subscribers of the same order to the common return line to the signal generator and thus closes the signal circuit for the identification, which is already prepared by the shifting of the contact *id* in the meter transmission following the connecting through of the identifying device to the meter transmission. After the order number has been delivered to the identifying device and the identifying device made ready for operation, the pulse switch *i*, which is developed for instance as a timing-relay circuit or as a flip-flop circuit is started up and the determination of the call number or sub-office code to be identified positively controlled thereby, the step switch W being advanced step-wise and upon each step causing a signal pulse to be given off by the pulse generator. In this connection, the following operating conditions can be distinguished.

1. *Determination of a sub-office code*

Upon the first step of the control switch W, the connecting relay PV is connected via the wiper arm *w*, which relay, by its contacts *pv* on the one hand prepares the response circuit for the supervisory relay UA and on the other hand connects the signal receiver S6 to the characterizing core KUA for calling subscribers from connected subplants. In the event that a signal is recorded by the signal receiver S6, the supervisory relay UA is connected by the closing of the contact *s6* which connects itself into a holding-circuit and so modifies, via additional contacts *ua*, the sequence of connection of the place relays OZ to E that only the place relays necessary to characterize the sub-office code are connected. Upon the next step of the control switch W thus for instance instead of the place relay OZ, the place relay H is connected. The contacts *h* of which, with simultaneous production of the repeater properties of the toroidal cores lying in column H connect the signal receivers S1 to S0 to the test windings of said cores. Let us assume, for instance, that the sub-plant having the code 660 is to be identified. In this case, upon the testing of the core column H by the signal receiver S6, a signal is recorded. The digit thus determined is transmitted by the coincidence of a corresponding receiver contact *s6* and of a contact *h* of the connected place relay H as ground pulse over the corresponding digit line to the register SP of the meter transmission Z–UE. In similar manner, upon the following steps of the control switch W, the place relays Z and E are connected, the torodial core columns Z and E are tested, and the digits determined in each case forwarded to the register. Upon the fifth step of the control switch W, with response of the relay AB, the supervisory relay UA is disconnected, the identifying device is disconnected from the meter transmission and the control switch W is brought into the rest position.

2. *Determination of the Subscriber Call Numbers*

If upon the testing of the sub-office core KUA, the supervisory relay UA does not respond, then the number of a subscriber of the connected main plant is to be determined. In the next two steps of the control switch W, the place relays OZ and OE are connected, one after the other, and via contact OZ and OE, connect the ground necessary to characterize the two digits directly at the corresponding digit lines to the register of the meter transmission.

During the connecting of the place relay OZ and the transfer of the tens digit of the locality code to the register of the meter transmission, the column T of the toroidal core evaluation panel is simultaneously tested by the signal receivers S1 to S0 which are connected by further contacts OZ. The digit determined in this testing process is stored in the register device consisting of the relays V1 to V0 in the manner that a contact of the signal receiver recording a result closes the response circuit, already prepared by another contact OZ, of the register relay characterizing this same digit which relay then connects itself into its own holding circuit. With the storage of this first digit of the sequence of digits resulting upon the testing of the torodial core evaluation panel, it is at the same time determined whether the sub-office digit characterizing the sub-office with line selector outputs common to several subscribers is identical to the digit stored in each case. For this, there is used the supervisory relay GL which can only respond when, in accordance with the example selected, the register relay V2 characterizing the sub-office digit 2 has responded.

In the event that the supervisory relay GL remains in rest position corresponding to the storage of one of the digits 1 or 3 to 0, then after the step relay OE, the step relay TZ is next connected by the control switch W and the sub-office digit transmitted to the register of the meter transmission. The transmission of the sub-office digit is effected via a contact TZ of the corresponding step relay TZ in series with a contact of one of the register relays V1 or V3 to V0, the counter-springs of which are connected together and are connected corresponding to the examples selected, with the digit line characterizing the sub-office digit 1. In similar manner, upon the following connection of the place relay T, the thousands digit of the call number is marked via a contact *t* in series with a contact of one of the register relays V1 to V0.

The determination of the remaining three digits of each call number of subscribers with individual line selector output is now effected in known manner in that upon the connecting of the following place relays H, Z and E, via the corresponding contacts *h, z* and *e,* the signal receivers S1 to S0 are connected to the toroidal core columns of the evaluation device which are to be tested in each case and the result registered at the time is marked by coincidence of a contact of the place relay connected each time with a contact of the signal receiver which records the result each time. Thereupon, with the connecting of the disconnecting relay AB upon the last step of the control switch W, the identifying device is disconnected from the meter transmission and the switch elements of the identifying device are brought into the rest position.

If, on the other hand, upon the evaluation of the first digit one of the series of digits of the supervisor relay GL which are determined by the evaluation device has responded, then the sequence of connection of the place relays is modified by reversal of the contact *gl* insofar as first of all the place relays T, H, Z and E are connected in series, while the place relay TZ which has been skipped in this sequence is the last connected. The sequence of digits determined by the evaluation device thus directly follows the two digits of the locality code. The last digit of the call number which digit is in this case still missing constitutes the order number of the subscriber to be identified. The transmission of this order number is effected by connection of the place relay TZ in the manner that via a contact *tz* in series with the contact *v*2 of the register relay V2 which in accordance with the example connects the supervisory relay GL, and a contact *px* of the register relay P*x* characterizing the order number is connected to the corresponding digit line to the register SP of the meter transmission Z–U*e*.

Figures 1A, 4:
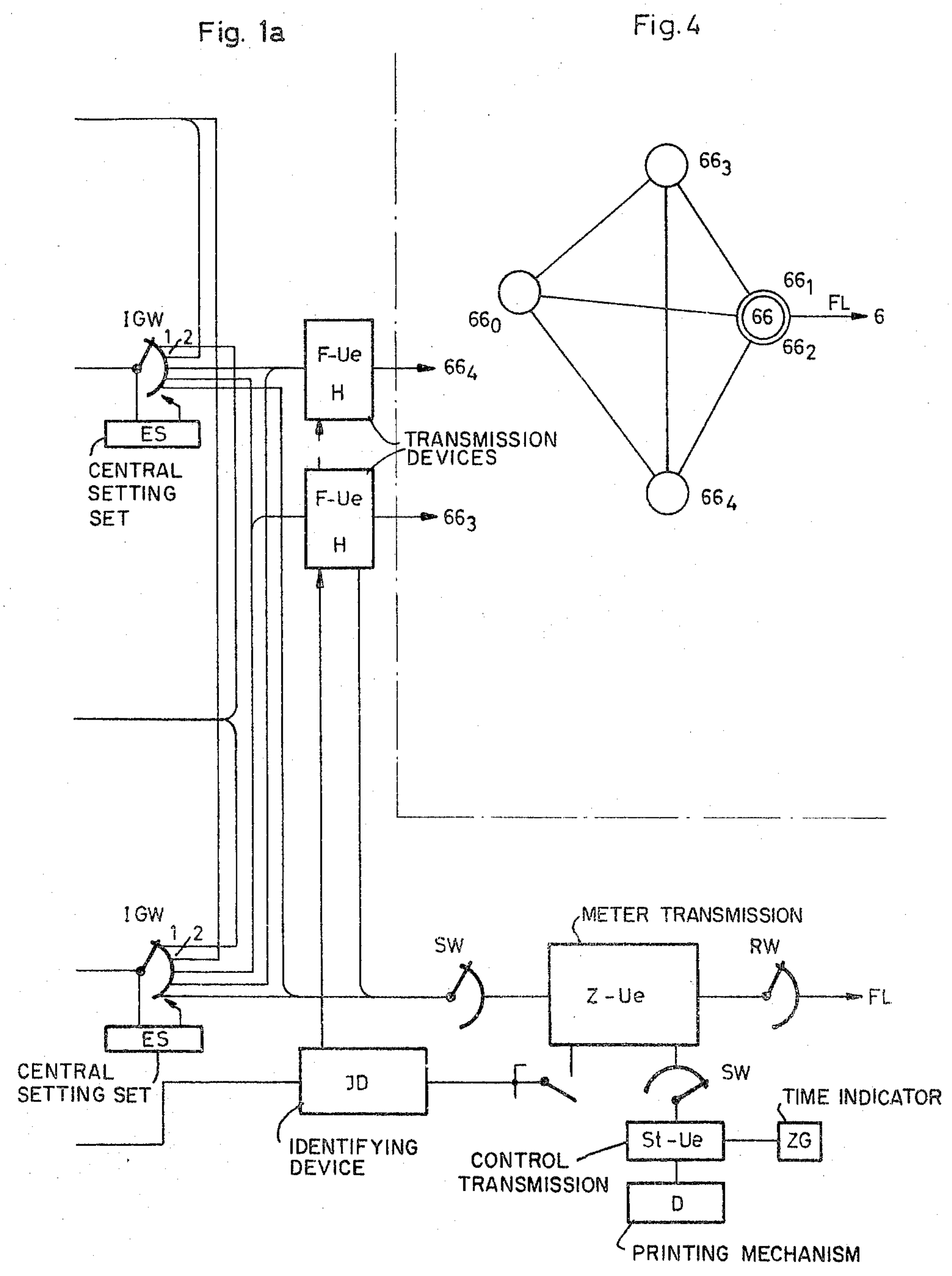
FIG. 4 shows the outside plant in case of the connection of sub-plants to the telephone office shown in FIG. 1.

Finally, it may also be mentioned that in telephone plants consisting of main and sub-plants having the same locality code as shown in FIG. 4, differing from the embodiment indicated above, only the different sub-office digits need to be determined by the evaluating device. This can be done in a simple manner in the manner that by proper arrangement of the change-over contacts *ua,* the place relays OZ, OE and E are connected one after the other instead of the place relays H, Z and E.

As the invention has been illustrated and described only in such detail as necessary to enable a full understanding of the invention, with known components being illustrated in block form, it might be mentioned that the general subject matter of FIGS. 1 and 1*a* of the drawings is generally illustrated in FIG. 4 of U.S. Patent No. 3,053,937, FIG. 3 of Patent No. 3,009,021, and FIG. 1 of Patent No. 3,078,347, which contain detailed descriptions of the individual elements with the exception of the control transmission S*t*–U*e,* the timer ZG, the printing device D, and the selector SW for the printing device. The last mentioned assemblies are likewise generally illustrated, for example, in U.S. Patents 2,740,836, 2,771,510 and 2,775,648, particularly referring in each case to FIG. 2 thereof, in which the meter transmission Z–U*e* corresponds to the ticket repeater, the selector SW to the ticket repeater finder, the control transmission S*t*–U*e* to the tabulator, the timer ZG to the date and timer unit, and the printing device D to the ticket tape punch or to the record tape punch.

Attention is also invited, for example, to the description starting with column 2, line 57, of Patent 2,775,648.

Changes may be made within the scope and spirit of the appended claims which define what is believed to be new and desired to have protected by Letters Patent.

I claim:

1. A circuit arrangement for the determination of call numbers of subscribers to party lines in telecommunication, particularly telephone installations, comprising evaluation circuits allocated to the individual call numbers, which characterize in a coordinate formed evaluation field the digits of the call numbers, said evaluation circuits marking the individual call numbers containing in each case one characterizing element less than there are places in each call number, the evaluation circuits for subscribers with line selector outlets in common for several subscribers being operative to mark all digits of the call number except the ordinal number of the correspondingly party line connection, means for storing such ordinal number of the corresponding party line connection and the evaluation circuits for subscribers with individual selector outlet being operative to mark all digits of the call number except the sub-office digit characterizing the appropriate group of subscribers, which digit is determined by associated connecting devices.

2. A circuit arrangement according to claim 1, comprising a number of place relays corresponding to the maximum number of places of the call numbers, serving for the transfer of the digits to a register, each of said place relays marking one place of the call number, the individual place relays being connected one after the other, and a combined register and testing device which registers in each case the first digit of the individual series of digits and determines the sequence of the connecting of the place relays as a function of said digit.

3. A circuit arrangement according to claim 2, comprising in further combination, signal receivers for testing said evaluation circuit, which signal receivers are connected thereto by spaced relay contacts.

4. A circuit arrangement according to claim 3, comprising in addition to the place relays an additional connecting relay which is connected in sequence before the place relays and connects the signal receivers to the evaluation device for the determination of the first digit of each series of digits with the corresponding characterization elements of the evaluation circuits.

5. A circuit arrangement according to claim 3, in connection with a system in which before each call number the corresponding locality code is transmitted to the register which further processes the same, wherein the connecting of the signal receivers for the determination of the first digit of each sequence of digits is effected by contacts of the place relay corresponding to the highest place of the locality code.

6. A circuit arrangement according to claim 2, for a telephone system comprising main and sub-exchanges, in which the code of the individual sub-exchange is determined by the identifying device of the main exchange, comprising in addition to the place relays another relay which is connected in sequence before the place relays and connects over its contacts the signal receivers to the marking members associated with the sub-exchange transmissions, and a further test switching member coupled with the signal receivers, having contacts over which the response circuits of the place relays can be so switched that the place relays necessary for the determination of the sub-office code are operatively connected in the course of the identification process.

7. A circuit arrangement according to claim 6, wherein the connecting and place relays are connected in series over a control switch to the outputs of which the connecting and place relays are connected.

8. A circuit arrangement according to claim 6, wherein the connecting and place relays form a relay chain which is stepped ahead by a pulse switch.

References Cited by the Examiner

UNITED STATES PATENTS

| | | | |
|---|---|---|---|
| 2,928,904 | 3/1960 | Morris | 179—17 |
| 2,955,166 | 10/1960 | McCreary | 179—18 |
| 3,025,355 | 3/1962 | Confeld et al. | 179—17 |

KATHLEEN H. CLAFFY, *Primary Examiner.*

WALTER L. LYNDE, ROBERT H. ROSE, *Examiners.*

H. BOOHER, H. ZELLER, *Assistant Examiners.*